US00RE40875E

(19) United States
(12) Reissued Patent
Minogue et al.

(10) Patent Number: US RE40,875 E
(45) Date of Reissued Patent: Aug. 18, 2009

(54) CONTROLLABLE LOAD APPARATUS

(75) Inventors: Conor Minogue, Galway (IE); Brian Walsh, Galway (IE); Seamus Moneley, County Mayo (IE)

(73) Assignee: BMR Research & Development Limited, Galway (IE)

(21) Appl. No.: 11/292,384

(22) Filed: Dec. 1, 2005

Related U.S. Patent Documents

Reissue of:
(64) Patent No.: 6,939,275
Issued: Sep. 6, 2005
Appl. No.: 10/316,410
Filed: Dec. 9, 2002

(30) Foreign Application Priority Data

Nov. 12, 2002 (GB) ..... 0226325

(51) Int. Cl.
*A63B 21/00* (2006.01)

(52) U.S. Cl. ..... 482/110; 482/111; 482/112

(58) Field of Classification Search ..... 482/1–9, 482/92, 110–113, 148, 900, 901
See application file for complete search history.

(56) References Cited

U.S. PATENT DOCUMENTS 4,063,726 A * 12/1977 Wilson
4,799,676 A * 1/1989 Sheppard et al.
5,011,142 A * 4/1991 Eckler ..... 482/5
5,312,315 A * 5/1994 Mortensen et al.
5,346,452 A * 9/1994 Ku
5,890,996 A * 4/1999 Frame et al.
6,413,195 B1 * 7/2002 Barzelay ..... 482/112

* cited by examiner

*Primary Examiner*—Glenn Richman
(74) *Attorney, Agent, or Firm*—Drinker Biddle & Reath LLP

(57) ABSTRACT

The invention relates to a controllable load apparatus for use in machines for resistive exercise training of the human body. The apparatus comprises a pneumatic cylinder (10) having a piston (12) acting on a fluid and a piston rod (14), the piston/cylinder unit (10, 12) being operated on by a person undergoing training. A pressure accumulator (20) is connected to, and pressurizes the piston/cylinder unit (10, 12) at a predetermined pressure during exercise via a pneumatic control circuit (42). Once a predetermined pressure threshold is reached, a valve means operates to prevent further fluid being available for charging the accumulator (20).

8 Claims, 3 Drawing Sheets

CONTROLLABLE LOAD APPARATUS

Matter enclosed in heavy brackets [ ] appears in the original patent but forms no part of this reissue specification; matter printed in italics indicates the additions made by reissue.

FIELD OF THE INVENTION

This invention relates to a controllable load apparatus for use in machines for resistive exercise training of the human body.

BACKGROUND OF THE INVENTION

It is well known to exercise the body for purposes of muscle strength training by way of resistive training, that is where a selected muscle or group of muscles is exercised against a mechanical resistance. The training may be (a) isometric, in which the muscle length remains constant and the associated joint angle remains constant, (b) isotonic, in which the muscle shortens or lengthens at a constant force throughout the range of movement: the external force may change such that the muscle force remains constant as the mechanical advantage varies with joint angle, (c) DCER (Dynamic Constant External Resistance), in which the external force is constant and the muscle force may change with different joint angles, and (d) isokinetic, in which the joint angular velocity is constant and the muscle force varies with varying joint angle. It is therefore apparent that it is desirable to be able to change the force-displacement characteristics of a resistance training device.

It is also known to prescribe an exercise regime in terms of a number of repetitions of a force equal to a stated percentage of the maximum force which that subject can exert, which will obviously vary between subjects and over time.

There is therefore a need to provide exercise apparatus in which a resistive force can readily be varied for different subjects, different muscles within a given subject, or during the carrying out of a particular type of exercise. An object of the present invention is to provide a controllable load apparatus which would be useful in such an application.

Resistance training devices are known in the art which operate on the principle of compressing a gas, usually air. These devices require the provision of a compressed air supply which is used to precharge a cylinder to a starting pressure, and corresponding starting resistance, using a pressure regulator. Such a source of compressed air is not practical in a portable exerciser.

U.S. Pat. No. 4,880,230 describes a pneumatic exerciser comprising a double acting cylinder where the resistance is controlled by restricting the air flow between the chambers on either side of the piston. The resistive force of such a system is highly dependent on the velocity of activation, since it is based on flow restriction.

U.S. Pat. No. 4,257,583 describes a pneumatic exercise device which uses an air compressor to charge pressure reservoirs.

SUMMARY OF THE INVENTION

Accordingly, the invention provides a controllable load apparatus for use in resistive exercise training, the apparatus comprising a fluid piston/cylinder unit which, in use, is operated on by a person undergoing training, a pressure accumulator connected to pressurise the piston/cylinder unit at a predetermined pressure during exercise, and pressure setting means for setting said predetermined pressure in the pressure accumulator.

In a preferred form of the invention the accumulator is pressurised by the user operating the piston/cylinder unit and the pressure setting means comprises a changeover valve which operates at a predetermined pressure to prevent further fluid being available for charging the accumulator. Said valve is preferably an electrically operated valve which may be controlled by an electronic circuit or program device.

The working fluid will typically be air. However, other gases may be used, as may liquids.

Typically, the cylinder will be fixed and the piston moved by the user, but the inverse is also possible.

The piston may be a plain piston, or may be provided with a valve or restrictor such that the piston/cylinder unit acts in the manner of a gas strut to provide a substantially constant force throughout the stroke.

The apparatus may include piston/cylinder means of reduced area for use in initially pressurising the accumulator.

BRIEF DESCRIPTION OF THE DRAWINGS

Embodiments of the invention will now be described, by way of example only, with reference to the drawings, in which.

DETAILED DESCRIPTION OF THE DRAWINGS

Figure 1:
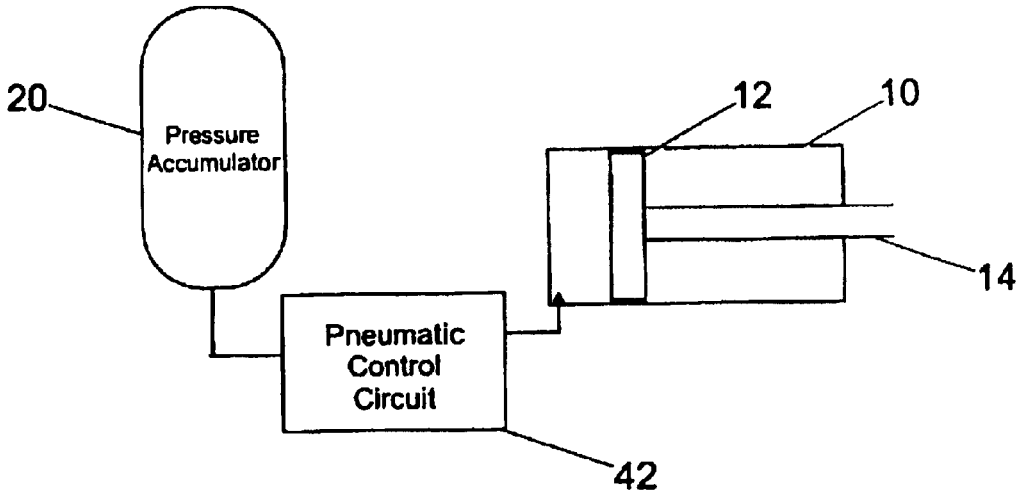
FIG. 1 is a general schematic of one form of the invention.

Referring to FIG. 1, the apparatus in general terms comprises a pneumatic cylinder 10 having a piston 12 and piston rod 14, the cylinder 10 being connected through a pneumatic control circuit 42 to a pressure accumulator 20.

Figure 2:
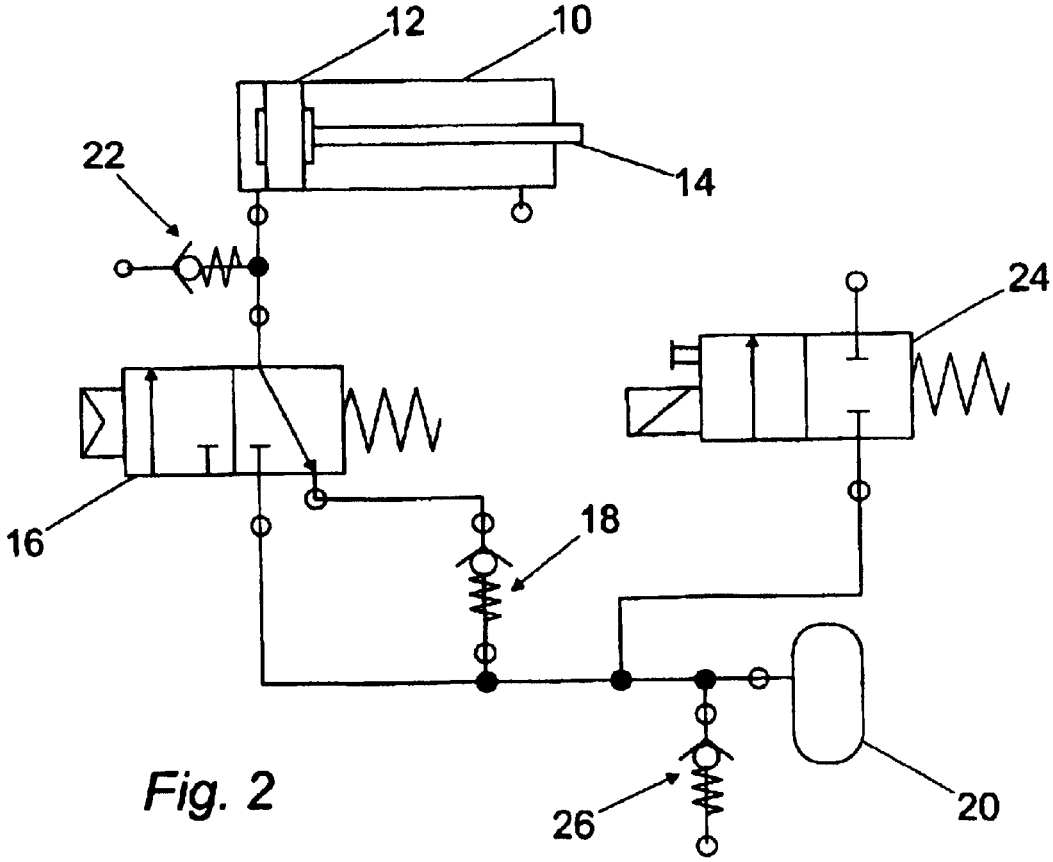
FIG. 2 is a schematic diagram of the pneumatic circuit of an apparatus forming a first embodiment of the invention.

In a simple form of the invention as shown in FIG. 2, the piston rod 14 forms a movable load-resisting member to which a user applies forces via a linkage (not shown). The cylinder 10 is connected through a changeover valve 16 and a one-way valve 18 to the pressure accumulator 20.

Starting from a discharged state, repeated strokes of the piston 12 compress air drawn in through intake valve 22 and the pressure builds in the accumulator 20. When a given target pressure has been reached, the valve 16 switches, thus connecting the cylinder 10 directly to the accumulator 20. In this condition, the force required to move the piston rod 14 depends on the elevated pressure in the system, and repeated exercises at this elevated resistance level can be carried out.

The valve 16 is preferably actuated electrically, which permits an electronic control circuit to set a desired force level or program of force levels. Alternatively, the valve 16 could be operated by a mechanical force setting system.

When exercise is completed, the system can be discharged by operating exhaust valve 24. A pressure relief valve 26 protects the system against over-pressure.

The foregoing embodiment can readily be extended to more than one cylinder operating in series or parallel. Moreover, it can easily be arranged to offer resistance in extension or compression or both by suitable porting of the cylinders.

Figure 3:
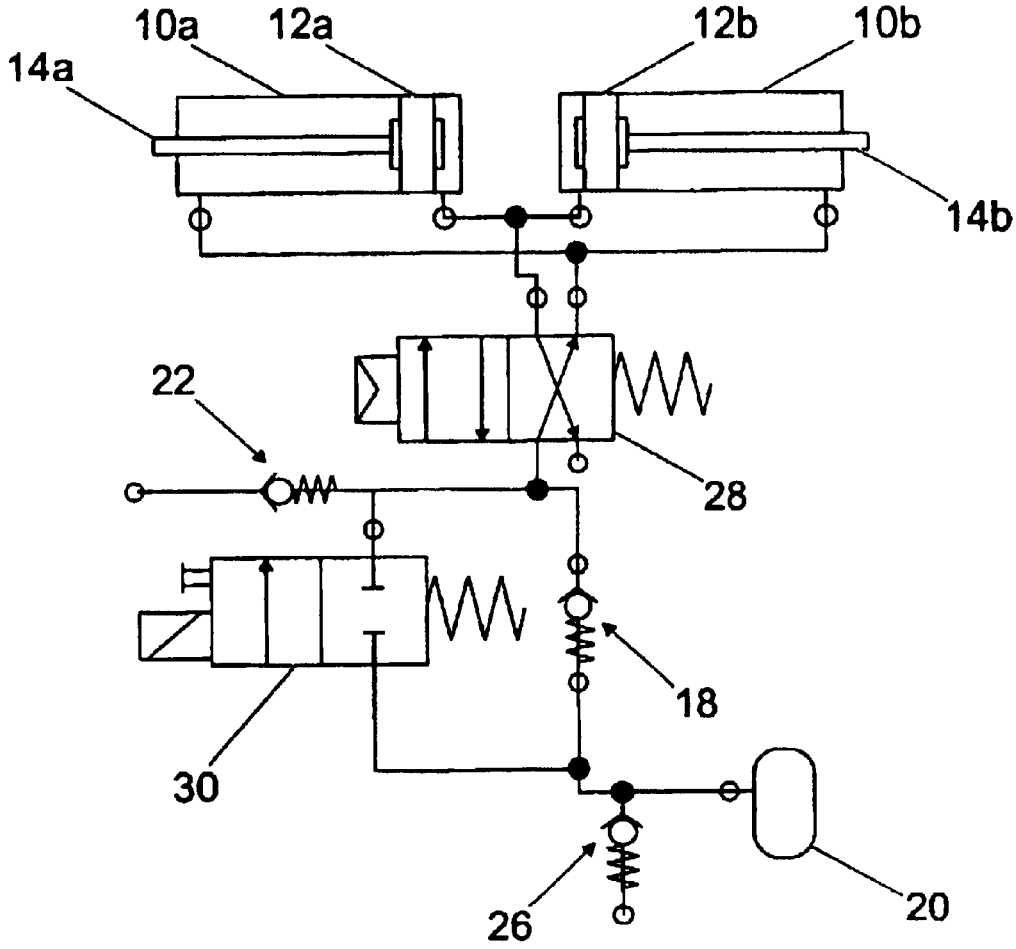
FIG. 3 is a similar diagram of a second embodiment.

FIG. 3 illustrates an exercise apparatus which can offer resistance in extension or compression. In FIG. 3 parts which are similar to those of FIG. 2 bear like reference numerals and will not be further described.

In this embodiment there are two cylinders 10a, 10b and corresponding pistons 12a, 12b and piston rods 14a, 14b. Valve 16 is replaced by a changeover valve 28 and an on-off valve 30. The charging of the pressure accumulator 20 can be achieved with the valves 28, 30 in the position shown. Resistance to compression is achieved with both valves 28 and 30 activated, and resistance to extension with valve 30 activated and valve 28 as shown.

Figure 4:
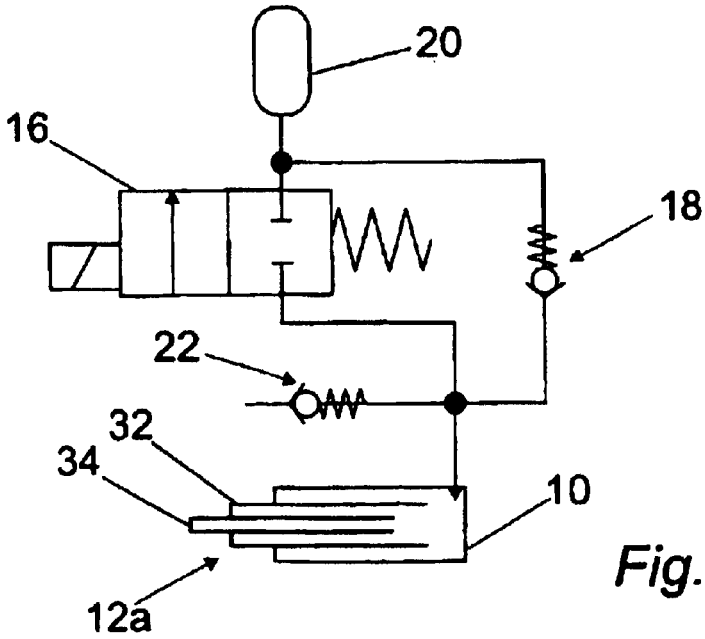
FIG. 4 illustrates a modification of the embodiment of FIG. 1.

Charging the accumulator to a high pressure required for operation can create a problem in that the subject may not be able to generate enough force on the piston rod to produce the required pressure. FIG. 4 shows one way of overcoming this problem. The cylinder 10 is provided with a modified piston 12a which comprises an outer piston 32 with an inner piston 34 nested telescopically therein. In normal use, the pistons 32, 34 are latched together and operate as a normal piston. For ease in generating the required high pressure, the outer piston 32 is placed in the closed position, the inner piston 34 is unlatched from the outer piston 32, and the inner piston is operated by the user to charge the accumulator. Because of the smaller area of the inner piston 34, the force required to achieve the desired pressure is reduced. Equally, the area of the outer piston 32 could be smaller and a similar principle employed.

The inner and outer pistons may be latched together by a user operable hand control, or alternatively under electrical control using a solenoid operated pin, a clutch or a rotating actuator.

Figure 5:
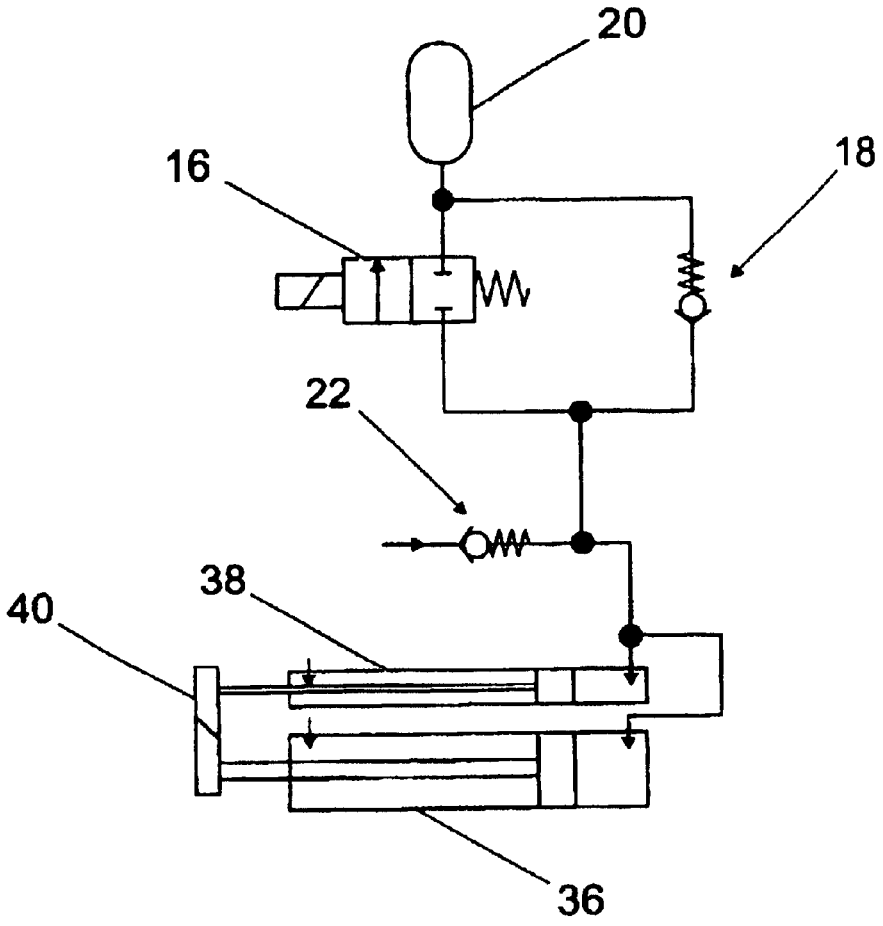
FIG. 5 shows an alternative modification.

FIG. 5 shows another way of achieving the same effect. Here, the cylinder 10 is replaced by a relatively large diameter cylinder 36 and a relatively small cylinder 38. The piston rods of these two cylinders are mechanically coupled at 40, but can be decoupled to allow the smaller cylinder to operate alone.

The relationship of force to displacement is determined by the volume of the cylinder, the volume of the accumulator, and the initial pressure of the cylinder and accumulator. It follows the gas equation P1V1=P2V2, where P1 is the starting pressure, P2 is the end pressure, V1 is the starting volume (in this case the combined volume of the cylinder and accumulator), and V2 is the end volume (in this case the volume of the accumulator alone).

The force-displacement characteristic follows the pressure-displacement characteristic since Force=Pressure× Area of Piston. This assumes that a conventional piston is used, and not a gas strut piston incorporating a pressure equalising valve.

Consider now in detail the sequence of actions required to exercise to a force of say 50 kgf. If the diameter of the piston is 3.5 cm then the area of the piston is 9.6 $cm^2$. The pressure at 50 kgf is therefore 50/9.6=5.2 bar. Assume the stroke length of the piston is 20 cm, and consequently the volume of air displaced is 192 $cm^3$, or say 0.19 litres.

An accumulator with a volume of 0.5 litre will be charged to 5.2 bar in approximately 14 strokes. When the apparatus is switched from the charge mode to the exercise mode the accumulator is connected to the cylinder and the piston rod extends (or retracts, depending on the required exercise). The pressure now reduces to 3.8 bar, assuming the changeover occurred at the end of a compressive stroke. Each subsequent exercise stroke therefore starts at 3.8 bar corresponding to 36 kgf and rises to 5.2 bar corresponding to 50 kgf at the end of the stroke.

It is apparent that, if a plain piston and cylinder is used in the apparatus of the present invention, a constant resistive force will not be achieved.

Figure 6:
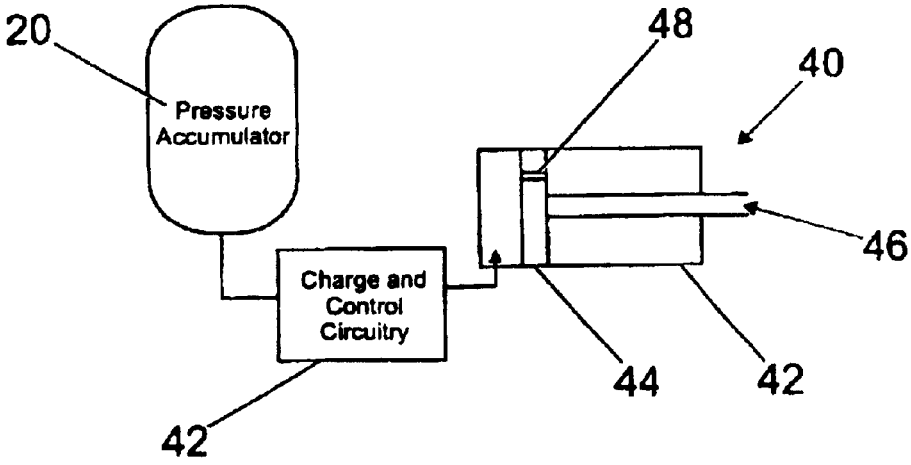
FIG. 6 shows, in simplified form, a further embodiment.

A constant resistive force can be provided by replacing the piston and cylinder with a gas strut type of device, as illustrated in principle in FIG. 6. In FIG. 6, the piston and cylinder 10, 12 is replaced by a gas strut device 40, which is connected to the accumulator 20 via charge and control circuitry indicated generally at 42. The gas strut device 40 comprises a cylinder 42, piston 44 and piston rod 46, the piston having a restricted aperture 48 therethrough.

A gas strut device provides a resistive force based on gas pressure. It is a closed system whereby the gas on the compression side of the piston leaks to the lower pressure side as the load is applied through valves or restrictions in the piston. In effect the pressure equalises either side of the piston and the residual force is derived from the unequal areas on either side of the piston; the piston rod reduces the effective area of the piston on its side. A gas strut therefore approximates to a constant force device, and the force level is determined by the gas pressure.

In the embodiment of FIG. 6, the initial pressurisation is produced by the user charging the accumulator 20 as described above, and in the exercise mode the user experiences a substantially constant force the amplitude of which is set by the level of the initial pressurisation.

The invention thus provides an exercise apparatus in which resistance ben set and controlled in a simple and convenient manner. In particular forms of the invention there can be achieved (a) a variety of force-displacement characteristics, parameterised by the starting force at the beginning of the stroke, the end force at the end of the stroke, and a number of points in between, (b) a range of force-displacement characteristics, and (c) no requirement for a separate compressed air supply.

Modifications may be made to the foregoing embodiments within the scope of the invention. For example an electric pump may be provided for effecting the initial charging of the pressure accumulator.

What is claimed is:

1. A controllable load apparatus for use in resistive exercise training the apparatus comprising a fluid piston/cylinder unit which, in use, is operated on by a person undergoing training, a pressure accumulator connected to pressurise the piston/cylinder unit at a predetermined pressure during exercise, and pressure setting means for setting said predetermined pressure in the pressure accumulator; and in which the piston/cylinder unit is in communication with the accumulator through a pneumatic control circuit which in an initial mode permits operation of the piston/cylinder unit by a user to initially pressurise the accumulator with ambient air to said predetermined pressure, and in a working mode connects the same piston/cylinder unit directly to the accumulator for training.

2. Apparatus according to claim 1, wherein the pressure setting means comprises a changeover valve within the pneumatic control circuit which operates at a predetermined pressure to prevent further fluid being available for charging the accumulator.

3. Apparatus according to claim 2, in which the changeover valve is an electrically operated valve which may be controlled by an electronic circuit or program device.

4. Apparatus according to claim 1, in which the working fluid is air.

5. Apparatus according to claim 1, in which the cylinder is fixed and the piston is moved by the user.

6. Apparatus according to claim 1, in which the piston is a plain piston.

7. Apparatus according to claim 1, in which the piston is provided with a valve or restrictor such that the piston/cylinder unit acts in the manner of a gas strut to provide a substantially constant force throughout the stroke.

8. Apparatus according to claim 1, in which said piston/cylinder unit comprises twin pistons which are coupled together for normal use and which are decoupled to provide a reduced area for initially pressurising the accumulator.

* * * * *